United States Patent
Chen et al.

(10) Patent No.: US 8,592,509 B2
(45) Date of Patent: Nov. 26, 2013

(54) RUBBER COMPOSITION HAVING IMPROVED CRACK RESISTANCE

(75) Inventors: Zhong-Ren Chen, Stow, OH (US); Steven Luo, Copley, OH (US)

(73) Assignee: Bridgestone Corporation, Tokyo (JP)

( * ) Notice: Subject to any disclaimer, the term of this patent is extended or adjusted under 35 U.S.C. 154(b) by 138 days.

(21) Appl. No.: 12/982,258

(22) Filed: Dec. 30, 2010

(65) Prior Publication Data

US 2011/0237729 A1   Sep. 29, 2011

Related U.S. Application Data

(60) Provisional application No. 61/291,469, filed on Dec. 31, 2009.

(51) Int. Cl.
*C08K 5/053* (2006.01)
*C08K 3/04* (2006.01)
*C08K 9/04* (2006.01)

(52) U.S. Cl.
USPC ........... 524/386; 524/388; 523/351; 523/526; 523/215; 523/206

(58) Field of Classification Search
USPC ........... 523/351, 526, 215, 206; 524/386, 388
See application file for complete search history.

(56) References Cited

U.S. PATENT DOCUMENTS 4,788,229 A * 11/1988 Bohm et al. ................... 523/215
5,717,022 A * 2/1998 Beckmann et al. ........... 524/493

* cited by examiner

*Primary Examiner* — Satya Sastri
(74) *Attorney, Agent, or Firm* — Meredith E. Hooker; Nathan T. Lewis

(57) ABSTRACT

A method includes: (a) mixing in a first step a first polymer and a filler, (b) mixing in a second step a second polymer and a polyhydroxy compound, and (c) mixing in a third mixing step the mixtures resulting from steps (a) and (b) and optionally additional filler, wherein said first polymer and second polymer may be the same polymer or different polymers, and wherein steps (a) and (b) can occur simultaneously or consecutively.

7 Claims, No Drawings

RUBBER COMPOSITION HAVING IMPROVED CRACK RESISTANCE

CROSS-REFERENCE TO RELATED APPLICATIONS

This application claims the benefit of priority from U.S. provisional application No. 61/291,469, filed on Dec. 31, 2009, which is hereby incorporated by reference.

FIELD OF THE DISCLOSURE

This disclosure generally relates to rubber compositions comprising a polyhydroxy compound, and methods of mixing the same.

SUMMARY

Disclosed is method of mixing a rubber composition comprising the steps: (a) mixing in a first step a first polymer and a filler, (b) mixing in a second step a second polymer and a polyhydroxy compound, and (c) mixing in a third mixing step the mixtures resulting from steps (a) and (b) and optionally additional filler, wherein said first polymer and second polymer may be the same polymer or different polymers, and wherein steps (a) and (b) can occur simultaneously or consecutively.

Other aspects of the present disclosure will be apparent to the ordinarily skilled artisan from the description that follows. To assist in understanding the description of various embodiments that follow, certain definitions are provided immediately below. These are intended to apply throughout unless the surrounding text explicitly indicates a contrary intention:

"polymer" means the polymerization product of one or more monomers and is inclusive of homo-, co-, ter-, tetra-polymers, etc.;

"copolymer" means a polymer that includes mer units derived from two reactants, typically monomers, and is inclusive of random, block, segmented, graft, gradient, etc., copolymers; and "phr" means parts by weight of a referenced material per 100 parts by weight rubber, and is a recognized term by those having skill in the rubber compounding art.

All references incorporated herein by reference are incorporated in their entirety unless otherwise stated.

DETAILED DESCRIPTION

A method according to the disclosure comprises: (a) mixing in a first step a first polymer and a filler, (b) mixing in a second step a second polymer and a polyhydroxy compound, and (c) mixing in a third mixing step the mixtures resulting from steps (a) and (b) and optionally additional filler, wherein said first polymer and second polymer may be the same polymer or different polymers, and wherein steps (a) and (b) can occur simultaneously or consecutively.

The first polymer may be any polymer, such as an elastomeric polymer or a conjugated diene polymer. Suitable polymers that may be used as the first polymer include, but are not limited to, polyisoprene (synthetic polyisoprene or natural rubber), styrene-butadiene rubber (SBR), styrene-isoprene rubber, styrene-isoprene-butadiene rubber, isoprene-butadiene rubber, polybutadiene (BR), acrylonitrile-butadiene rubber (NBR), silicone rubber, fluoroelastomers, ethylene acrylic rubber, nitrile rubber, hydrogenated nitrile rubber, ethylene propylene rubber (EPR), ethylene propylene diene monomer (EPDM) rubber, butyl rubber, polychloroprene, and mixtures thereof. In a preferred embodiment, the first polymer comprises isoprene mer units. If the first polymer is one that contains isoprene mer units, it may be any polymer comprising isoprene mer units. Suitable polymers containing isoprene mer units may include, but are not limited to, those selected from the group consisting of polyisoprene (natural rubber or synthetic polyisoprene), isoprene-butadiene copolymer, isobutylene-isoprene copolymer, styrene-isoprene rubber, and mixtures thereof. In one embodiment, the first polymer is polyisoprene.

The first polymer may have a number average molecular weight of between about 100,000 to about 500,000, or between about 125,000 to about 400,000, or between about 150,000 to about 300,000.

In an embodiment, the first polymer may have a Tg (glass transition temperature) of about −120° C. to about −5° C., such as about −115° C. to about −90° C., about −50° C. to about −80° C., or about −10° C. to about −45° C.

The first polymer may be added to the rubber composition in an amount ranging from about 1 phr to about 99 phr, or from about 10 phr to about 80 phr, or from about 20 phr to about 60 phr, or from about 30 phr to about 50 phr.

The second polymer may be the same or different from the first polymer, and may be selected from the suitable polymers listed above.

The second polymer may be added to the rubber composition in an amount ranging from about 1 phr to about 99 phr, or from about 20 phr to about 80 phr, or from about 40 phr to about 80 phr, or from about 50 phr to about 70 phr.

In an embodiment, the rubber composition contains a filler. The filler may be selected from the group consisting of carbon black, silica, and mixtures thereof. The total amount of filler may be from about 1 to about 200 phr, or alternatively from about 5 to about 100 phr, or alternatively from about 30 to about 80 phr, or from about 40 to about 70 phr.

Carbon black may be present in an amount of about 1 to about 200 phr, or alternatively in an amount of about 5 to about 100 phr, or alternatively in an amount of about 30 to about 80 phr. Suitable carbon blacks include commonly available, commercially-produced carbon blacks and those having a surface area of at least 20 $m^2/g$, or preferably, at least 35 $m^2/g$ up to 200 $m^2/g$ or higher. Among useful carbon blacks are furnace black, channel blacks, and lamp blacks. A mixture of two or more of the above blacks can be used. Exemplary carbon blacks include, but are not limited to, N-110, N-220, N-339, N-330, N-352, N-550, N-660, as designated by ASTM D-1765-82a.

Examples of reinforcing silica fillers which can be used include wet silica (hydrated silicic acid), dry silica (anhydrous silicic acid), calcium silicate, and the like. Among these, precipitated amorphous wet-process, hydrated silicas are preferred. Silica can be employed in an amount of about 1 to about 100 phr, or alternatively in an amount of about 5 to about 80 phr, or alternatively in an amount of about 30 to about 80 phr. The useful upper range is limited by the high viscosity imparted by fillers of this type. Some of the commercially available silicas which can be used include, but are not limited to, HiSil® 190, HiSil® 210, HiSil® 215, HiSil® 233, HiSil® 243, and the like, produced by PPG Industries (Pittsburgh, Pa.). A number of useful commercial grades of different silicas are also available from DeGussa Corporation (e.g., VN2, VN3), Rhone Poulenc (e.g., Zeosil 1165 MP0), and J. M. Huber Corporation.

The surface of the carbon black and/or silica may also be treated or modified to improve the affinity to particular types of polymers. Such surface treatments and modifications are well known to those skilled in the art.

If silica is used as a filler, it may be desirable to use a coupling agent to couple the silica to the polymer. Numerous coupling agents are known, including but not limited to organosulfide polysulfides and organoalkoxymercaptosilanes. Any organosilane polysulfide may be used. Suitable organosilane polysulfides include, but are not limited to, 3,3'-bis(trimethoxysilylpropyl)disulfide, 3,3'-bis(triethoxysilylpropyl)disulfide, 3,3'-bis(triethoxysilylpropyl)tetrasulfide, 3,3'-bis(triethoxysilylpropyl)octasulfide, 3,3'-bis(trimethoxysilylpropyl)tetrasulfide, 2,2'-bis(triethoxysilylethyl)tetrasulfide, 3,3'-bis(trimethoxysilylpropyl)trisulfide, 3,3'-bis(triethoxysilylpropyl)trisulfide, 3,3'-bis(tributoxysilylpropyl)disulfide, 3,3'-bis(trimethoxysilylpropyl)hexasulfide, 3,3'-bis(trimethoxysilylpropyl)octasulfide, 3,3'-bis(trioctoxysilylpropyl)tetrasulfide, 3,3'-bis(trihexoxysilylpropyl)disulfide, 3,3'-bis(tri-2"-ethylhexoxysilylpropyl)trisulfide, 3,3'-bis(triisooctoxysilylpropyl)tetrasulfide, 3,3'-bis(tri-t-butoxysilylpropyl)disulfide, 2,2'-bis(methoxydiethoxysilylethyl)tetrasulfide, 2,2'-bis(tripropoxysilylethyl)pentasulfide, 3,3'-bis(tricycloneoxysilylpropyl)tetrasulfide, 3,3'-bis(tricyclopentoxysilylpropyl)trisulfide, 2,2'-bis(tri-2"-methylcyclohexoxysilylethyl)tetrasulfide, bis(trimethoxysilylmethyl)tetrasulfide, 3-methoxyethoxypropoxysilyl 3'-diethoxybutoxy-silylpropyl tetrasulfide, 2,2'-bis(dimethylmethoxysilylethyl)disulfide, 2,2'-bis(dimethylsecbutoxysilylethyl)trisulfide, 3,3'-bis(methylbutylethoxysilylpropyl)tetrasulfide, 3,3'-bis(di t-butylmethoxysilylpropyl) tetrasulfide, 2,2'-bis(phenylmethylmethoxysilylethyl)trisulfide, 3,3'-bis(diphenyl isopropoxysilylpropyl)tetrasulfide, 3,3'-bis(diphenylcyclohexoxysilylpropyl)disulfide, 3,3'-bis(dimethylethylmercaptosilylpropyl)tetrasulfide, 2,2'-bis(methyldimethoxysilylethyl)trisulfide, 2,2'-bis(methyl ethoxypropoxysilylethyl)tetrasulfide, 3,3'-bis(diethylmethoxysilylpropyl)tetrasulfide, 3,3'-bis(ethyldi-secbutoxysilylpropyl)disulfide, 3,3'-bis(propyldiethoxysilylpropyl)disulfide, 3,3'-bis(butyldimethoxysilylpropyl)trisulfide, 3,3'-bis(phenyldimethoxysilylpropyl)tetrasulfide, 3'-trimethoxysilylpropyl tetrasulfide, 4,4'-bis(trimethoxysilylbutyl)tetrasulfide, 6,6'-bis(triethoxysilylhexyl)tetrasulfide, 12,12'-bis(triisopropoxysilyl dodecyl)disulfide, 18,18'-bis(trimethoxysilyloctadecyl)tetrasulfide, 18,18'-bis(tripropoxysilyloctadecenyl)tetrasulfide, 4,4'-bis(trimethoxysilyl-buten-2-yl)tetrasulfide, 4,4'-bis(trimethoxysilylcyclohexylene)tetrasulfide, 5,5'-bis(dimethoxymethylsilylpentyl)trisulfide, 3,3'-bis(trimethoxysilyl-2-methylpropyl)tetrasulfide and 3,3'-bis(dimethoxyphenylsilyl-2-methylpropyl)disulfide.

Suitable organoalkoxymercaptosilanes include, but are not limited to, triethoxy mercaptopropyl silane, trimethoxy mercaptopropyl silane, methyl dimethoxy mercaptopropyl silane, methyl diethoxy mercaptopropyl silane, dimethyl methoxy mercaptopropyl silane, triethoxy mercaptoethyl silane, tripropoxy mercaptopropyl silane, ethoxy dimethoxy mercaptopropylsilane, ethoxy diisopropoxy mercaptopropylsilane, ethoxy didodecyloxy mercaptopropylsilane and ethoxy dihexadecyloxy mercaptopropylsilane. Such organoalkoxymercaptosilanes may be capped with a blocking group, i.e., the mercapto hydrogen atom is replaced with another group. A representative example of a capped organoalkoxymercaptosilane coupling agent is a liquid 3-octanoylthio-1-propyltriethoxysilane, available as NXT™ Silane from Momentive Performance Materials Inc.

Mixtures of various organosilane polysulfide compounds and organoalkoxymercaptosilanes can be used.

The amount of coupling agent in the composition is the amount needed to produce acceptable results. The amount of coupling agent is typically based on the weight of the silica in the composition, and may be from about 0.1% to about 20% by weight of silica, or alternatively from about 1% to about 15% by weight of silica, or alternatively from about 1% to about 10% by weight of silica.

Additional fillers may also be utilized, including but not limited to, mineral fillers, such as clay, talc, aluminum hydrate, aluminum hydroxide and mica. The foregoing additional fillers are optional and in some embodiments can be utilized in varying amounts from about 0.5 phr to about 40 phr.

In one or more embodiments, polyhydroxy compounds include those compounds containing two or more hydroxy groups (i.e., OH) per molecule. In one or more embodiments, the polyhydroxy compounds may be characterized by an equivalent molecular weight of less than 100 g/mole, in other embodiments less than 80 g/mole, in other embodiments less than 60 g/mole, and in other embodiments less than 40 g/mole, where the equivalent molecular weight is defined as the molecular weight of a polyhydroxy compound divided by the number of hydroxy groups per molecule.

In one or more embodiments, the polyhydroxy compounds may be characterized by a boiling point that is in excess of about 180° C., in other embodiments in excess of about 200° C., in other embodiments in excess of about 220° C., in other embodiments in excess of about 240° C., and in other embodiments in excess of about 260° C. at ambient atmospheric pressure. For example, the polyhydroxy compounds may be characterized by a boiling point that is between about 180° C. and about 260° C. at ambient atmospheric pressure.

Types of polyhydroxy compounds include di-hydroxy compounds, tri-hydroxy compounds, tetra-hydroxy compounds, and multi-hydroxy compounds. Polyhydroxy compounds may include aliphatic polyhydroxy compounds, cycloaliphatic polyhydroxy compounds, and aromatic polyhydroxy compounds.

In an embodiment, suitable di-hydroxy compounds include 1,2-ethanediol (also called ethylene glycol), 1,2-propanediol (also called propylene glycol), 1,3-propanediol (also called trimethylene glycol), 2,3-dimethyl-2,3-butanediol (also called pinacol), 2,2-dimethyl-1,3-propanediol (also called neopentylglycol), 1,2-butanediol, 1,3-butanediol, 1,4-butanediol, 2,3-butanediol, 1,2-pentanediol, 1,3-pentanediol, 1,4-pentanediol, 1,5-pentanediol, 2,3-pentanediol, 2,4-pentanediol, 1,2-hexanediol, 1,5-hexanediol, 1,6-hexanediol, 2,5-hexanediol, diethylene glycol, triethylene glycol, dipropylene glycol, diethanolamine, N-n-butyldiethanolamine, N-t-butyldiethanolamine, 3-diisopropylamino-1,2-propanediol, 1,2-cyclopentanediol, 1,3-cyclopentanediol, 1,2-cyclohexanediol, 1,3-cyclohexanediol, 1,4-cyclohexanediol, 3-methoxy-1,2-propanediol, and catechol.

Suitable tri-hydroxy compounds include 1,2,3-propanetiol (also called glycerol or glycerine), 2-hydroxymethyl-1,3-propanediol, 1,2,4-butanetriol, 1,1,1-tris(hydroxymethyl)ethane, 1,2,6-hexanetriol, 1,1,1-tris(hydroxymethyl)propane, 1,2,3-heptanetriol, 1,3,5-cyclohexanetriol, pyrogallol, triethanolamine, triisopropanolamine, 1-[N,N-bis(2-hydroxyethyl)amino]-2-propanol, and 2-deoxyribose.

Suitable tetra-hydroxy compounds include pentaerythritol, erythritol, threitol, 1,3-dihydroxyacetone dimer, glyceraldehyde dimer, fucose, 2-deoxy-galactose, and 2-deoxy-glucose.

Suitable multi-hydroxy compounds include glucose, allose, arabinose, lyxose, ribose, xylose, xylulose, galactose, mannose, tagatose, fructose, melibiose, arabitol, hexahydroxycyclohexane (also called inositol), xylitol, mannitol, and sorbitol.

Other ingredients that may be employed in the rubber composition include oils, waxes, scorch inhibiting agents, tackifying resins, reinforcing resins, fatty acids such as stearic acid, peptizers, vulcanization agents and vulcanization accelerators. These ingredients are known in the art, and may be added in appropriate amounts based on the desired physical and mechanical properties of the rubber composition.

The rubber composition can be prepared by mixing the ingredients of the composition together by methods known in the art, such as, for example, by kneading the ingredients together in a Banbury mixer. By way of example, all of the ingredients other than the vulcanization agents and vulcanization accelerators may be mixed in at least one non-productive mixing step. Subsequently, in a productive mixing step, the vulcanization agents and vulcanization accelerators may then be mixed with the mixture obtained in the non-productive mixing step(s). However, these mixing methods are only exemplary and other contemplated methods may be used to prepare the rubber composition.

In one embodiment, the rubber composition may be prepared by mixing in a first step the first polymer and a filler. In a second step, a second polymer and a polyhydroxy compound are mixed. In a third step, the mixtures obtained from the first and second steps are mixed, optionally with additional filler. If a filler is added in the third step, it may be the same as or different from the filler utilized in the first step. Subsequently, the vulcanization agents and vulcanization accelerators may then be mixed with the mixture obtained in the third step.

The mixing steps where ingredients other than vulcanization agents and vulcanization accelerators are mixed, i.e., non-productive mixing steps, may be conducted at a temperature of about 130° C. to about 200° C. If more than one of these mixing steps are used, the temperatures achieved can be the same or different from each other.

In an embodiment, the method can further include a remill step between the non-productive and productive mixing steps, in which no ingredients are added. The remill step may reduce the compound viscosity and improve the dispersion of the filler. The drop temperature of the remill step is typically from about 130° C. to about 175° C., especially from about 145° C. to about 165° C.

The mixing step where vulcanization agents and vulcanization accelerators are added, i.e., the productive mixing step, is conducted at a temperature below the vulcanization temperature in order to avoid unwanted precure of the rubber composition. Therefore, the temperature of the productive mixing step should not exceed about 120° C. and is typically about 40° C. to about 120° C., suitably about 60° C. to about 110° C. and, especially, about 75° C. to about 100° C.

The rubber composition of the disclosure is particularly useful as a tire component, although other rubber articles may also be formed. Exemplary tire components include, but are not limited to, tread and sidewall. There are many benefits of the disclosed rubber composition, including improved crack growth resistance.

The present disclosure will be described in more detail with reference to the following examples. The following examples are presented for purposes of illustration only and are not to be construed in a limiting sense.

EXAMPLES

Three rubber compositions were prepared according to the formulations shown in Table 1. Table 1 also identifies the mixing step where each ingredient was added. The compositions were prepared by mixing the ingredients together in a Banbury mixer. As can be seen in Table 1, Composition 1 contains no polyhydroxy compound. Composition 2 contains ethylene glycol added in the third mixing step, and Composition 3 contains ethylene glycol added in the second mixing step.

TABLE 1

|  | Composition 1 | Composition 2 | Composition 3 |
|---|---|---|---|
| Mixing Step 1 |  |  |  |
| Natural Rubber | 60 | 60 | 60 |
| Carbon Black | 6 | 6 | 6 |
| Mixing Step 2 |  |  |  |
| Polybutadiene | 0 | 0 | 40 |
| Ethylene Glycol | 0 | 0 | 0.4 |
| Mixing Step 3 |  |  |  |
| Composition from Mixing Step 1 | 66 | 66 | 66 |
| Composition from Mixing Step 2 | 0 | 0 | 40.4 |
| Polybutadiene | 40 | 40 | 0 |
| Ethylene Glycol | 0 | 0.4 | 0 |
| Carbon Black | 44 | 44 | 44 |
| Aromatic Oil | 2 | 2 | 2 |
| Stearic acid | 2 | 2 | 2 |
| Antioxidants | 1.5 | 1.5 | 1.5 |
| Waxes | 1 | 1 | 1 |
| Resin | 1 | 1 | 1 |
| Mixing Step 4 |  |  |  |
| Composition from Mixing Step 3 | 157.5 | 157.9 | 157.9 |
| Zinc Oxide | 3.5 | 3.5 | 3.5 |
| Antioxidants | 0.3 | 0.3 | 0.3 |
| Accelerators | 1.3 | 1.3 | 1.3 |
| Sulfur | 1 | 1 | 1 |

Properties of the rubber compositions are shown in Table 2. Mooney viscosity of the rubber compositions was determined in accordance with ASTM D-1646 at 130° C.

To conduct tensile and crack growth testing, the rubber compositions were vulcanized for 15 minutes at 171° C. Tensile mechanical properties were measured by using the procedure described in ASTM-D 412 at 72° F. The tensile test specimens had dumbbell shapes with a thickness of 1.9 mm. A specific gauge length of 25.4 mm was used for the tensile test.

Crack growth testing was done by Dc/Dn. Dc/Dn testing was done on a specimen having the specifications according to Die C of ASTM-D 412. The sample is pre-cut 0.5 mm in the center of the sample in the direction perpendicular to the strain. The initial gauge length of the specimen is 25 mm. Cyclic deformation is applied along the length direction with a strain amplitude of either 60%, 75%, 95% and 115%. The frequency is 240 cycles per minute. The Dc/Dn testing was conducted at room temperature. The number of cycles necessary to cause the sample to break are recorded, with a higher number of cycles indicating a better crack growth resistance.

TABLE 2

|  | Composition 1 | Composition 2 | Composition 2 |
|---|---|---|---|
| Mooney Viscosity | 82 | 84.3 | 84.3 |
| Modulus @ 100% elongation, 72° F. (Mpa) | 3.4 | 3.4 | 3.4 |
| Modulus @ 300% elongation, 72° F. (Mpa) | 15.3 | 15.2 | 15.0 |
| Tensile at Break, 72° F. (Mpa) | 25.5 | 26.7 | 26.7 |
| Elongation at Break, 72° F. (%) | 470 | 493 | 498 |
| Cut Growth (nm/cycle) | 38 | 36 | 25 |
| Tear Energy (N/m$^2$) | 2255 | 2245 | 2174 |

As can be seen in Table 2, the compositions have approximately the same modulus at 100% elongation. Thus, the compositions have approximately the same modulus for the Cut Growth test since the testing is conducted at a maximum of 115% strain. Unexpectedly, Composition 3, wherein ethylene glycol was added in a second mixing step, has improved crack resistance properties when compared to Compositions 1 and 2.

The description has been provided with exemplary embodiments. Obviously, modifications and alterations will occur to others upon reading and understanding the preceding detailed description. It is intended that the exemplary embodiments be construed as including all such modifications and alterations insofar as they come within the scope of the appended claims or the equivalents thereof.

We claim:

1. A method comprising:
   a. mixing in a first step:
      i. a first polymer,
      ii. a filler,
   b. mixing in a second step:
      i. a second polymer,
      ii. a polyhydroxy compound,
   c. mixing in a third step:
      i. the mixtures obtained in steps (a) and (b),
      ii. optionally, additional filler,
   wherein said first polymer and second polymer may be the same or different, and wherein steps (a) and (b) can occur simultaneously or consecutively;
   wherein the filler or additional filler are not present in the second step.

2. The method of claim 1, wherein the polyhydroxy compound has a boiling point that is in excess of about 180° C. at ambient atmospheric pressure.

3. A method comprising,
   a. mixing in a first step:
      i. a first polymer,
      ii. a filler,
   b. mixing in a second step:
      i. a second polymer,
      ii. a polyhydroxy compound,
   c. mixing in a third step:
      i. the mixtures obtained in steps (a) and (b),
      ii. optionally, additional filler,
   wherein said first polymer and second polymer may be the same or different, and wherein steps (a) and (b) can occur simultaneously or consecutively;
   wherein the polyhydroxy compound is selected from the group consisting of tri-hydroxy compounds, tetra-hydroxy compounds, multi-hydroxy compounds, 1,2-ethanediol, 1,2-propanediol, 1,3-propanediol, 2,3-dimethyl-2,3-butanediol, 2,2-dimethyl-1,3-propanediol, 1,2-butanediol, 1,3-butanediol, 1,4-butanediol, 2,3-butanediol, 1,2-pentanediol, 1,3-pentanediol, 1,4-pentanediol, 1,5-pentanediol, 2,3-pentanediol, 2,4-pentanediol, 1,2-hexanediol, 1,5-hexanediol, 1,6-hexanediol, 2,5-hexanediol, diethylene glycol, triethylene glycol, dipropylene glycol, diethanolamine, N-n-butyldiethanolamine, N-t-butyldiethanolamine, 3-diisopropylamino-1,2-propanediol, 1,2-cyclopentanediol, 1,3-cyclopentanediol, 1,2-cyclohexanediol, 1,3-cyclohexanediol, 1,4-cyclohexanediol, 3-methoxy-1,2-propanediol, and catechol;
   wherein the filler consists of carbon black.

4. The method of claim 1, wherein the polyhydroxy compound is selected from the group consisting of tri-hydroxy compounds, tetra-hydroxy compounds, 1,2-ethanediol, 1,2-propanediol, 1,3-propanediol, 2,3-dimethyl-2,3-butanediol, 2,2-dimethyl-1,3-propanediol, 1,2-butanediol, 1,3-butanediol, 1,4-butanediol, 2,3-butanediol, 1,2-pentanediol, 1,3-pentanediol, 1,4-pentanediol, 1,5-pentanediol, 2,3-pentanediol, 2,4-pentanediol, 1,2-hexanediol, 1,5-hexanediol, 1,6-hexanediol, 2,5-hexanediol, diethylene glycol, triethylene glycol, dipropylene glycol, diethanolamine, N-n-butyldiethanolamine, N-t-butyldiethanolamine, 3-diisopropylamino-1,2-propanediol, 1,2-cyclopentanediol, 1,3-cyclopentanediol, 1,2-cyclohexanediol, 1,3-cyclohexanediol, 1,4-cyclohexanediol, 3-methoxy-1,2-propanediol, catechol, glucose, allose, arabinose, lyxose, ribose, xylose, xylulose, galactose, mannose, tagatose, fructose, melibiose, arabitol, hexahydroxycyclohexane, xylitol, mannitol, and sorbitol.

5. The method of claim 1, wherein said first polymer is selected from the group consisting of styrene-butadiene rubber, styrene-isoprene rubber, styrene-isoprene-butadiene rubber, isoprene-butadiene rubber, polybutadiene, acrylonitrile-butadiene rubber, silicone rubber, fluoroelastomers, ethylene acrylic rubber, nitrile rubber, hydrogenated nitrile rubber, ethylene propylene rubber, ethylene propylene diene monomer rubber, butyl rubber, polychloroprene, and mixtures thereof.

6. The method of claim 1, further comprising mixing in an additional step the mixture obtained in step (c) and curatives, and then curing the composition to form a tire component.

7. The method of claim 1, wherein the polyhydroxy compound is selected from the group consisting of aliphatic polyhydroxy compounds, cycloaliphatic polyhydroxy compounds, and aromatic polyhydroxy compounds.

* * * * *